(12) United States Patent
Lin et al.

(10) Patent No.: US 6,932,478 B1
(45) Date of Patent: Aug. 23, 2005

(54) REFLECTIVE TYPE LIGHT VALVE PROJECTION DEVICE

(75) Inventors: Ching-Fuh Lin, Taipei (TW); Shu-I Lin, Taipei (TW)

(73) Assignee: View & Vision Technology Corp., Taipei (TW)

( * ) Notice: Subject to any disclaimer, the term of this patent is extended or adjusted under 35 U.S.C. 154(b) by 0 days.

(21) Appl. No.: 10/777,168

(22) Filed: Feb. 13, 2004

(51) Int. Cl.[7] .................. G03B 21/00; G03B 21/26; G03B 21/28; G03B 21/14; G02B 27/14
(52) U.S. Cl. ..................... 353/31; 353/20; 353/34; 353/37; 353/99; 359/634
(58) Field of Search ............................ 353/20, 31, 33, 353/34, 37, 98, 99, 84; 349/5, 7, 8, 9; 359/634, 359/890

(56) References Cited

U.S. PATENT DOCUMENTS

| | | | |
|---|---|---|---|
| 5,451,103 A * | 9/1995 | Hatanaka et al. | 353/31 |
| 6,046,858 A * | 4/2000 | Scott et al. | 359/634 |
| 6,113,239 A * | 9/2000 | Sampsell et al. | 353/31 |
| 6,498,632 B1 * | 12/2002 | Butterworth et al. | 349/77 |

* cited by examiner

Primary Examiner—Judy Nguyen
Assistant Examiner—Melissa J Koval
(74) Attorney, Agent, or Firm—Rosenberg, Klein & Lee

(57) ABSTRACT

A reflective type light valve projection device comprises an incident light source, a first and a second dichroic beam splitters/combiners, three light valves of the three primary colors and a projection lens. The light source provides a white light. The first dichroic beam splitter/combiner can reflect the first primary color and transmit the other two primary colors, and the second dichroic beam splitter/combiner can respectively reflect and transmit the two primary colors passing through the first dichroic beam splitter/combiner, hence completely separating the three primary colors. After the three primary colors are respectively modulated and reflected by the three light valves, they are combined by the first and second dichroic beam splitters/combiners to form a full color image, which is finally projected out by the projection lens. The optimum full-color projection effect can thus be accomplished with the least component.

23 Claims, 2 Drawing Sheets

REFLECTIVE TYPE LIGHT VALVE PROJECTION DEVICE

FIELD OF THE INVENTION

The present invention relates to a reflective type light valve projection device and, more particularly, to an optical projection device making use of dichroic beam splitters/combiners and image light valves of the three primary colors and capable of accomplishing the optimum full-color projection effect with the least components through appropriate arrangement.

BACKGROUND OF THE INVENTION

General reflective type liquid crystal projection optical engines have different architectures. For example, companies such as JVC, Philips, Color Link, RDI, and Aurora System produce reflective type liquid crystal projection devices of different structures. Almost all the structures adopt an X-prism. Color Link and RDI adopt their own color selectors to achieve the object of light-splitting projection.

Generally, reflective type liquid crystal projection devices mainly adopt the X-prism architecture to let the three primary colors of red (R), green (G), and blue (B) enter three different sets of polarization beam splitters (PBS) and then combine together. Three light beams are the common design idea. They differ only in variation of light projection system. Different light projection systems have different usage efficiencies of light energy and different sizes of occupied volume. However, the above projection devices have more complicated structures and require more optical components. Besides, it is necessary to take different polarization states of the same color light into account for light splitting, and the requirements for transmission and reflection differ. Therefore, the manufacturing is more difficult, and the production cost is higher. Furthermore, the optimum usage efficiencies of the three primary colors R, G and B can't be accomplished.

For projection systems adopting prism type beam combiners or PBS, the weight is larger and the material cost is higher. Moreover, because light travels a longer path in the prism type components, the accumulated total optical path difference will be large due to variation and non-uniformity of refractive index of components owing to heat, hence causing distortion of image. Furthermore, because prism type components have an inferior heat-radiating performance, it is difficult to solve the thermal effects.

Accordingly, the present invention aims to propose a reflective type light valve projection device, which can effectively make use of space, shrink the volume, and simplify the manufacturing process for lowering the production cost.

SUMMARY AND OBJECTS OF THE PRESENT INVENTION

The primary object of the present invention is to provide a reflective type light valve projection device capable of effectively making use of space and shrinking the volume. The reflective type light valve projection device makes use of dichroic beam splitters/combiners and image light valves of the three primary colors to accomplish the optimum usage efficiencies with the least components.

Another object of the present invention is to provide a reflective type light valve projection device, which uses simpler beam splitters/combiners to reduce optical adjustment actions and also lower the production cost.

Yet another object of the present invention is to provide a light-splitting reflective type optical device used for full-color image projection, wherein the optical paths of the three primary colors are made equal to avoid color distortion of image.

To achieve the above objects, a reflective type light valve projection device of the present invention comprises an incident light source, a first and a second dichroic beam splitters/combiners, three light valves of the three primary colors and a projection lens. The light source provides a white incident light. The first dichroic beam splitter/combiner is used to reflect the first primary color to separate it from the second and third primary colors. The second dichroic beam splitter/combiner is used to separate the second and third primary colors. After the three primary colors are modulated and reflected by the three light valves, the first and second dichroic beam splitters/combiners can collect the first and second primary colors. The projection lens is then used to collect the three primary colors respectively reflected and transmitted by the first and second dichroic beam splitters/combiners after modulation for projecting out a full-color image.

The various objects and advantages of the present invention will be more readily understood from the following detailed description when read in conjunction with the appended drawings, in which:

DETAILED DESCRIPTION OF PREFERRED EMBODIMENT

A reflective type light valve projection device of the present invention makes use of dichroic beam splitters/combiners and image light valves of the three primary colors to accomplish the optimum full-color projection effect with the least components through appropriate arrangement of their positions and angles.

Figure 1:
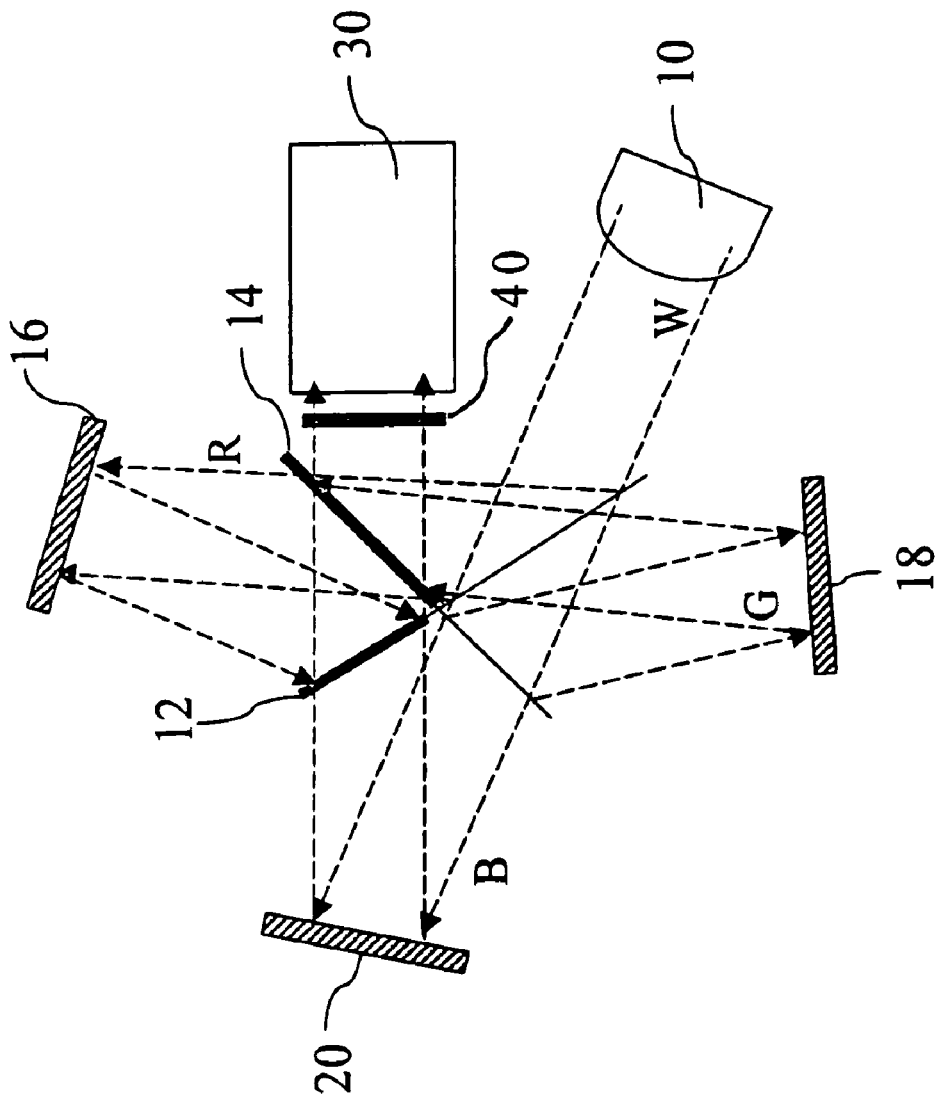
FIG. 1 is a structure diagram of the present invention.

As shown in FIG. 1, a light source 10 is used to provide an incident white light W required by this projection device. When the white light W is incident onto a first dichroic beam splitter/combiner 12 located on its optical path, the splitting region of the first dichroic beam splitter/combiner 12 can reflect red light R while transmit green light G and blue light B, hence separating the red light R. When the transmitted green light G and blue light B are incident onto a second dichroic beam splitter/combiner 14 behind the first dichroic beam splitter/combiner 12 (the first and second dichroic beam splitters/combiners are crosswise arranged), the splitting region of the second dichroic beam splitter/combiner 14 can reflect the green light G while transmit the blue light B. The three primary colors R, G and B can thus be completely separated through the two dichroic beam splitters/combiners 12 and 14.

The separated red light R, green light G and blue light B are respectively projected onto a red light valve 16, a green light valve 18 and a blue light valve 20 for image modulation. The blue light B will be reflected onto the combining region of the second dichroic beam splitter/combiner 14 and transmit through. The green light G will be reflected from the green light valve 18, then travels to the combining region of the second dichroic beam splitter/combiner 14 and is reflected by the second dichroic beam splitter/combiner 14. The red light R will be reflected from the red light valve 16, then travels to the combining region of the first dichroic beam splitter/combiner 12 and is reflected by the first dichroic beam splitter/combiner 12. Afterwards it transmits through the second dichroic beam splitter/combiner 14. The red light R, the green light G and the blue light B will thus be collected as a high-brightness and high-contrast full-color image, which is finally projected onto a screen by a projection lens 30.

The red light valve 16 and the blue light valve 20 are symmetrically arranged with the first dichroic beam splitter/combiner 12 as the reference plane. The green light valve 18 and the blue light valve 20 are symmetrically arranged with the second dichroic beam splitter/combiner 14 as the reference plane. Therefore, the traveled optical path of the red light R, the green light G and the blue light B in the projection device are all equal, hence reducing the color distortion of the full-color image to a minimum.

The above arrangement of the red light valve 16, the green light valve 18 and the blue light valve 20 is only an example. In practical application, the positions of these light valves can be interchanged. Moreover, the splitting and combining requirements of the first and second dichroic beam splitters/combiners 12 and 14 can vary according to the positions of these light valves.

The reflective type light valve projection device is characterized in the structure design of the dichroic beam splitters/combiners. Although beam splitting and combining are carried out with the same mirror, they are accomplished on different regions of the first or second dichroic beam splitter/combiner. This design has a great advantage. Because of different incident angles for beam splitting and combining, the requirements for film coating will differ. Because beam splitting and combining are accomplished on different regions, the optimum effects can be achieved at individual regions for beam splitting and combining. If beam splitting and combining are accomplished at the same region, the requirements for film coating need to be met for two different angles. This will complicate the manufacturing of the dichroic beam splitters/combiners. Moreover, the beam splitting and combining effects will be affected.

Because beam splitting and combining are accomplished at individual regions of the first and second dichroic beam splitters/combiners 12 and 14, the beam splitting region and the beam combining region will have different film coating structures. Or two mirrors having different film coating can be joined together to form a single mirror by means of gluing or assembling.

Figure 2:
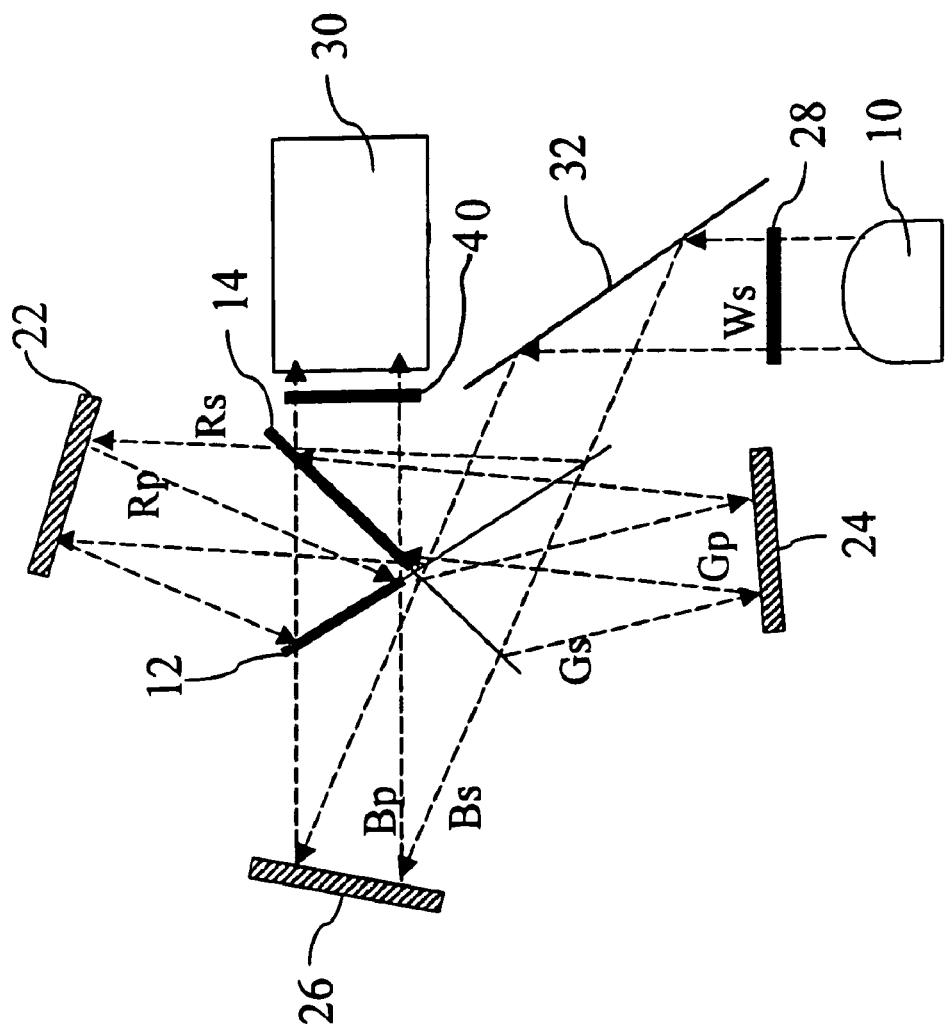
FIG. 2 is a diagram according to a preferred embodiment of the present invention.

FIG. 2 is a diagram according to a preferred embodiment of the present invention. The primary structure is approximately the same as that shown in FIG. 1. However, the three light valves used as image modulating devices in FIG. 1 are replaced with a red liquid crystal panel 22, a green liquid crystal panel 24 and a blue liquid crystal panel 26. In order to meet the polarization requirements of the liquid crystal panels and effectively exploit the energy of the light source 10, a polarization conversion device 28 can be added outside the light source 10 to convert light of the light source 10 into a linearly polarized white light Ws. The S-polarized white light Ws is separated by the first and second dichroic beam splitters/combiners 12 and 14 to from an S-polarized red light Rs, an S-polarized green light Gs and an S-polarized blue light Bs. After these three S-polarized primary colors are respectively modulated and reflected by the red liquid crystal panel 22, the green liquid crystal panel 24 and the blue liquid crystal panel 26, their polarization will change to form a P-polarized red light Rp, a P-polarized green light Gp and a P-polarized blue light Bp. These three P-polarized primary color lights are then collected as a full-color image beam RGBp, which is then projected out by the projection lens 20. The detailed optical paths are the same as those in the previous embodiment and thus will not be further described. Moreover, a reflecting mirror 32 can be added on the optical path of the polarized light to change the traveling direction of light for making the most effective use in limited space.

In the above description, the polarization conversion device 28 is added outside the light source 10 to convert light of the light source 10 into a linearly s-polarized white light. The polarization will change to p-polarization after the light is reflected by the liquid crystal panels. This can also be done with the polarization conversion device 28 added outside the light source 10 to convert light of the light source 10 into a linearly p-polarized white light. the liquid crystal panels then change the light to be s-polarized. The other operation is similar to the above description except the polarization requirement is switched between the s-polarization and the p-polarization.

A polarization selection device or a polarizer 40 can be added in front of the projection lens 30 to select the polarized light changed by the liquid crystal light valves and filter out undesired stray light, thereby letting the projected image have better contrast.

Besides, in the present invention's design, because the dichroic beam splitters/combiners only perform the reflection or transmission action to a single primary color without the need of considering the problem of polarization, the manufacturing will be simpler, and the cost will be lower. Furthermore, using the same beam splitter/combiner to accomplish beam splitting and combining can greatly reduce the number of optical components of the whole device and thus decrease optical adjustment actions, hence enhancing the production speed and lowering the production cost.

In the present invention, because beam combining is accomplished with a full mirror having no seam in the conventional X-prism, there will be no seam line on the screen of a high-resolution optical projection device. This is a very conspicuous advantage especially for very high-resolution optical projection.

Another advantage of the present invention is that the beam combining function is accomplished with a mirror instead of a bulk prism, hence having a better heat-radiating effect. Moreover, because the optical path in the mirror is shorter, the accumulated total optical path difference will be smaller, hence letting the image quality be less subject to the influence of temperature.

In addition, the light source used in a common projection device also includes infrared light and ultraviolet light, which will enter the first and second dichroic beam splitters/combiners and the light valves along with the three primary color lights. The infrared light will generate heat to cause variation of refractive index or extra stress. This will affect the lifetime and imaging quality of this optical system. In order to avoid bad influence of infrared light, an infrared filter can be added before light entering the first and second dichroic beam splitters/combiners to separate the infrared light from the three primary color lights, thereby preventing the infrared light from entering the first and second dichroic beam splitters/combiners and the light valves. The ultraviolet light may damage liquid crystal in the light valves to affect the lifetime of the light valves and the imaging quality of this optical device. In order to avoid bad influence of the ultraviolet light, an ultraviolet filter can be added before light entering the first and second dichroic beam splitters/combiners to separate the ultraviolet light from the three primary color lights, thereby preventing the ultraviolet light from entering the first and second dichroic beam splitters/combiners and the light valves.

The above infrared filter and ultraviolet filter can be the same mirror, which is coated to separate visible light and invisible light. Or the mirror can be made of material capable of absorbing ultraviolet light and then coated to separate infrared light from the three primary color lights. The above infrared filter and ultraviolet filter can also be different mirrors, one for separating infrared light from the three primary color lights, the other for separating ultraviolet light from the three primary color lights.

To sum up, the present invention proposes a reflective type light valve projection device capable of effectively making use of space and shrinking the volume. The reflective type light valve projection device makes use of dichroic beam splitters/combiners and image light valves of the three primary colors to accomplish the optimum usage efficiency with the least components.

Although the present invention has been described with reference to the preferred embodiments thereof, it will be understood that the invention is not limited to the details thereof. Various substitutions and modifications have been suggested in the foregoing description, and other will occur to those of ordinary skill in the art. For instance, the above image light valves can be replaced with digital light processors (DLP) having no requirement for polarization. Therefore, all such substitutions and modifications are intended to be embraced within the scope of the invention as defined in the appended claims.

We claim:

1. A reflective type light valve projection device comprising:
   an incident light source for providing an incident light;
   a first dichroic beam splitter/combiner located on the optical path of said incident light for reflecting a first primary color to separate said first primary color from a second and a third primary colors;
   a second dichroic beam splitter/combiner located on the optical path of said incident light for separating the second and third primary colors passing through said first dichroic beam splitter/combiner, each of said first and second dichroic beam splitter/combiners having separate and distinct beam splitting and beam combining regions formed thereon and being formed in one-piece formation, each said beam splitting region being coated with a first film coating for separating a respective primary color of light from incident light, each said beam combining region being coated with a second film coating for combining a respective primary color of light with a transmitted light ray;
   three light valves including a first light valve, a second light valve and a third light valve and used as image modulating devices, said three light valves respectively modulating and reflecting the three primary colors separated by said first and second dichroic beam splitters/combiners to let said first and second dichroic beam splitters/combiners collect the modulated and reflected first and second primary colors; and
   a projecting lens for collecting the three primary colors reflected and transmitted by said first and second dichroic beam splitters/combiners after modulation to project out a full-color image.

2. The reflective type light valve projection device as claimed in claim 1, wherein said first light valve and said third light valve are symmetrically arranged with said first dichroic beam splitter/combiner as the reference plane, and said third light valve and said second light valve are symmetrically arranged with said second dichroic beam splitter/combiner as the reference plane.

3. The reflective type light valve projection device as claimed in claim 1, wherein said first and second dichroic beam splitters/combiners can be crosswise arranged.

4. The reflective type light valve projection device as claimed in claim 3, wherein said first, second and third light valves are so arranged that the optical path of said modulated and reflected third primary color, the optical path of said second primary color reflected by said second dichroic beam splitter/combiner after modulation, and the optical path of said first primary color reflected by said first dichroic beam splitter/combiner after modulation overlap mutually.

5. The reflective type light valve projection device as claimed in claim 1, wherein said first light valve, said second light valve and said third light valve are a red liquid crystal panel, a green liquid crystal panel and a blue liquid crystal panel, respectively.

6. The reflective type light valve projection device as claimed in claim 1, wherein said first, second and third light valves are digital light processors.

7. The reflective type light valve projection device as claimed in claim 1, wherein an s-p polarization conversion device is further disposed outside said incident light source for converting polarity of said incident light, and said incident light first passes through said polarization conversion device before entering said first and second dichroic beam splitters/combiners.

8. The reflective type light valve projection device as claimed in claim 1, wherein a polarization selection component is further disposed outside said incident light source for initially polarizing said incident light, and said incident light first passes through said polarization selection component before entering said first and second beam splitters/combiners.

9. The reflective type light valve projection device as claimed in claim 5, wherein a polarization selection component is further disposed outside said incident light source, and said incident light first passes through said polarization selection component before entering said first and second beam splitters/combiners.

10. The reflective type light valve projection device as claimed in claim 1, wherein a polarization selection component can further be disposed in front of said projection lens after said light leaving said first and second dichroic beam splitters/combiners.

11. The reflective type light valve projection device as claimed in claim 5, wherein a polarization selection component can further be disposed in front of said projection lens after said light leaving said first and second dichroic beam splitters/combiners.

12. The reflective type light valve projection device as claimed in claim 1, wherein a reflecting mirror can further be provided outside said light source to change the projection direction of light.

13. The reflective type light valve projection device as claimed in claim 5, wherein a reflecting mirror can further be provided outside said light source to change the projection direction of light.

14. The reflective type light valve projection device as claimed in claim 6, wherein a reflecting mirror can further be provided outside said light source to change the projection direction of light.

15. The reflective type light valve projection device as claimed in claim 1, wherein the beam splitting and combining regions of said two dichroic beam splitters/combiners do not overlap each other.

16. The reflective type light valve projection device as claimed in claim 1, wherein the beam splitting and combining regions of said two dichroic beam splitters/combiners each have different film structures.

17. The reflective type light valve projection device as claimed in claim 1, wherein the beam splitting and combining regions of said two dichroic beam splitters/combiners are on different mirrors glued together.

18. The reflective type light valve projection device as claimed in claim 1, wherein the beam splitting and combining regions of said two dichroic beam splitters/combiners are on different mirrors assembled together.

19. The reflective type light valve projection device as claimed in claim 1, wherein an infrared filter can further be provided before said light entering said first and second dichroic beam splitters/combiners to separate infrared light from said three primary colors, thereby preventing infrared light from entering said first and second dichroic beam splitters/combiners and said light valves, each of said first and second dichroic beam splitters/combiners defining a mirror.

20. The reflective type light valve projection device as claimed in claim 1, wherein an ultraviolet filter can further be provided before said light entering said first and second dichroic beam splitters/combiners to separate ultraviolet light from said three primary colors, thereby preventing ultraviolet light from entering said first and second dichroic beam splitters/combiners and said light valves, each of said first and second dichroic beam splitters/combiners defining a mirror.

21. The reflective type light valve projection device as claimed in claim 19, wherein said infrared filter and said ultraviolet filter are each formed on a respective one of said mirrors.

22. The reflective type light valve projection device as claimed in claim 20, wherein said infrared filter and said ultraviolet filter are each formed on a respective one of said mirrors.

23. A reflective type light valve projection device comprising:

an incident light source for providing an incident light;

a first dichroic beam splitter/combiner located on the optical path of said incident light for reflecting a first primary color to separate said first primary color from a second and a third primary colors;

a second dichroic beam splitter/combiner located on the optical path of said incident light for separating the second and third primary colors passing through said first dichroic beam splitter/combiner, said first dichroic beam splitter/combiner being disposed in a non-orthogonal crossed arrangement with said second dichroic beam splitter/combiner;

three light valves including a first light valve, a second light valve and a third light valve and used as image modulating devices, said three light valves respectively modulating and reflecting the three primary colors separated by said first and second dichroic beam splitters/combiners to let said first and second dichroic beam splitters/combiners collect the modulated and reflected first and second primary colors; and a projecting lens for collecting the three primary colors reflected and transmitted by said first and second dichroic beam splitters/combiners after modulation to project out a full-color image, wherein said first light valve and said third light valve are symmetrically arranged with said first dichroic beam splitter/combiner as the reference plane, and said third light valve and said second light valve are symmetrically arranged with said second dichroic beam splitter/combiner as the reference plane.

* * * * *